United States Patent [19]
Alland et al.

[11] Patent Number: 5,964,822
[45] Date of Patent: Oct. 12, 1999

[54] AUTOMATIC SENSOR AZIMUTH ALIGNMENT

[75] Inventors: Stephen William Alland; James Fredrick Searcy, both of Tucson, Ariz.

[73] Assignee: Delco Electronics Corp., Kokomo, Ind.

[21] Appl. No.: 08/968,742

[22] Filed: Aug. 27, 1997

[51] Int. Cl.[6] .............................. G01S 13/93; G01S 7/40
[52] U.S. Cl. .............................. 701/301; 701/96; 342/90; 367/98; 367/103
[58] Field of Search ...................... 701/301, 223, 701/96; 342/69, 70, 73, 81, 90, 139, 140, 455; 356/3; 367/98, 103, 118, 119

[56] References Cited

U.S. PATENT DOCUMENTS

| | | | |
|---|---|---|---|
| 5,314,037 | 5/1994 | Shaw et al. | 180/169 |
| 5,467,283 | 11/1995 | Butsuen et al. | 701/301 |

Primary Examiner—Tan Nguyen
Attorney, Agent, or Firm—Jimmy L. Funke

[57] ABSTRACT

This disclosure relates to a system for automatically measuring and compensating for any angle of misalignment of a forward-looking sensor of a vehicle. The sensor provides data representing the azimuth angle and the range of a target such as another vehicle. For each angle and range reading of the sensor, the location point of the target is estimated; after a series of such readings, the trajectory line of the target is estimated. The angle of misalignment is estimated from the angle between the trajectory line and the path of travel of the host vehicle. In subsequent readings of the sensor, the estimated angle of misalignment is subtracted from the measured azimuth angle to produce an accurate azimuth angle of the target. The accurate azimuth angle is provided for use by another unit such as a collision warning system and/or an intelligent cruise control.

15 Claims, 6 Drawing Sheets

AUTOMATIC SENSOR AZIMUTH ALIGNMENT

FIELD OF THE INVENTION

This invention relates to apparatus for use in vehicles (such as automotive vehicles) for automatic correction of azimuth angle data fed, for example, to collision warning and/or intelligent cruise control systems.

BACKGROUND OF THE INVENTION

Collision warning systems, primarily for use in road vehicles, are being developed and tested. In a typical system of this nature, a sensor (referred to as a Forward Looking Sensor or FLS) is mounted at the forward end of a host vehicle and provides data representative of the range of a target vehicle or other object, the range rate, and the azimuth angle of the target. The range is the distance between the host and the target, the range rate is the rate of change of the range, and the azimuth angle is the angle in a horizontal plane between the target and the direction of travel (the path or trajectory) of the host vehicle. A microprocessor receives the data plus path prediction data (from the yaw rate and the speed of the host vehicle), and calculates whether a collision is likely. An alarm may be sounded, the throttle may be backed off, and/or the brakes may be applied by the system, to avoid a collision.

A system generally as described above may also be incorporated in an Intelligent Cruise Control (ICC) system and operate to adjust the vehicle speed to maintain an appropriate timed headway or following distance.

As mentioned above, a system of this character provides a close estimate of the location of the target relative to the path of travel of the host vehicle. A close estimate, in turn, has in the past required that the FLS viewing axis be closely aligned, in a horizontal plane, with the axis of the host vehicle (the direction of travel) so that the range and azimuth angle relative to the host vehicle may be accurately estimated.

Such FLS sensors rely on radar, laser or ultrasonic signal transmitter/receivers, and typical installation tolerances in vehicle assembly at the factory do not normally meet the required accuracy of alignment. A more precise mechanical alignment at the factory or at a service facility is possible but it would be time consuming and costly.

Even if a practical arrangement were feasible for accurately aligning the FLS with the vehicle axis during manufacture, it would not solve all problems. For example, there might be subsequent changes in the FLS alignment during usage and/or misalignment relative to the path of travel of the host vehicle caused by vehicle "crabbing" (wherein the vehicle axles are not perpendicular to the path of travel) which would not be detected.

It is a general object of the present invention to avoid the foregoing problems by providing improved apparatus and method for automatically sensing, during operation of a host vehicle, any misalignment of the sensor, and for automatically compensating for any misalignment.

SUMMARY OF THE INVENTION

This invention relates to a method and apparatus for compensating or adjusting for any misalignment of a forward looking sensor mounted on a host vehicle. The sensor is mounted on the host vehicle in a position to sense a target (such as another vehicle or a stationary object) and provide data relating to the range and azimuth angle of the target. The sensor makes a plurality of readings of the range and azimuth angle, and for each reading a target location point is determined. A plurality of such location points are determined, and the trajectory line of the target is estimated from the location points. The misalignment angle of the sensor is estimated from the angle between the trajectory line and the path of travel of the host vehicle. The misalignment angle may then be combined with subsequent sensor data such as to adjust the subsequent data to compensate for the misalignment.

BRIEF DESCRIPTION OF THE DRAWINGS

The invention will be better understood from the following detailed description taken in conjunction with the accompanying figures of the drawings, wherein.

DETAILED DESCRIPTION OF THE INVENTION

Figure 1:
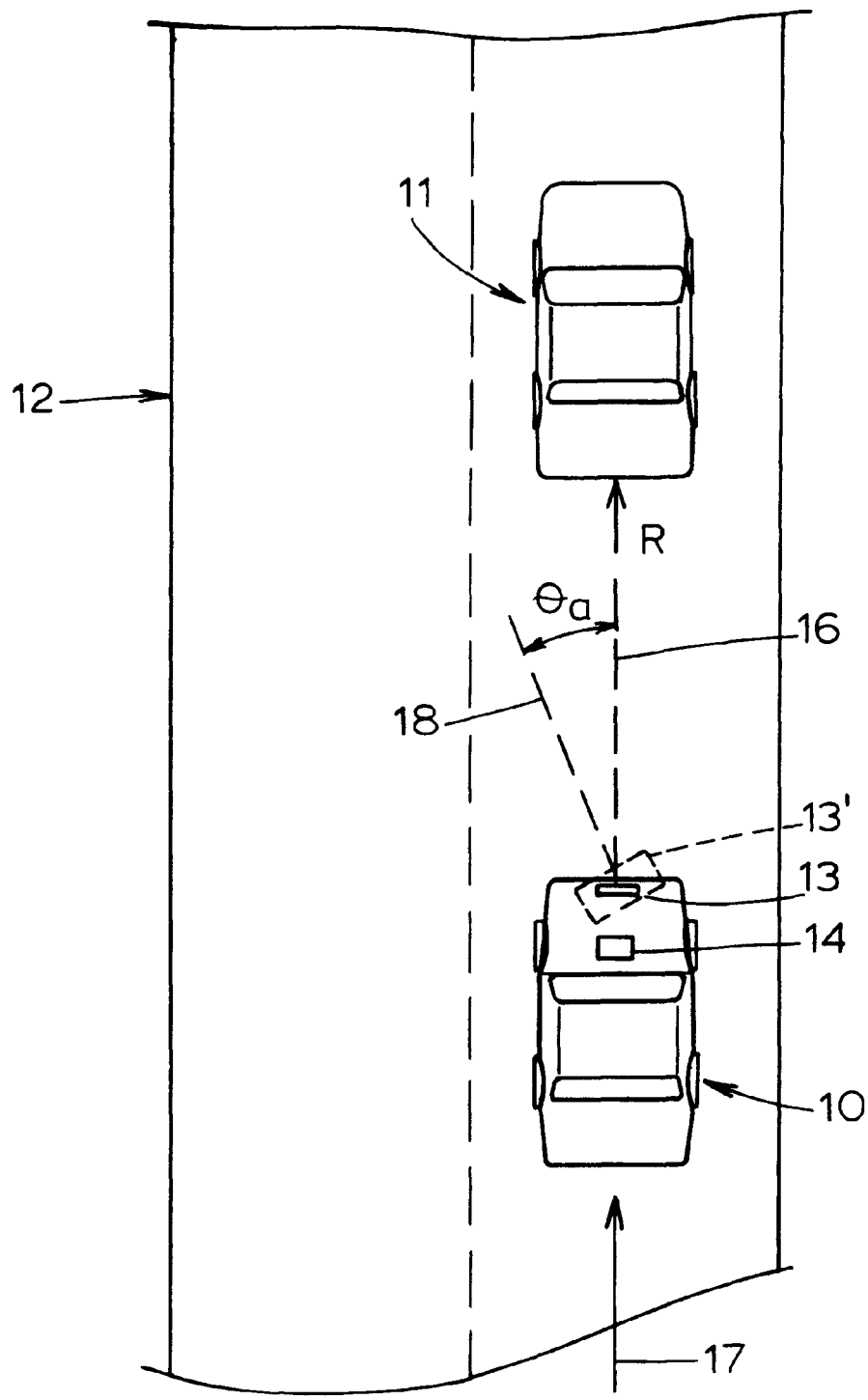
FIG. 1 is a diagram illustrating the operation and use of the present invention.

FIG. 1 shows a host vehicle 10 and a target vehicle 11 traveling in the same direction (upward in this figure) and in the same lane on a two-lane road 12. The host vehicle 10 has a forward-looking sensor (FLS) 13, shown in solid lines, mounted adjacent the front end of the host vehicle 10. In this specific example, the FLS 13 is connected to a microprocessor 14 which includes apparatus in accordance with this invention and a collision warning system of the host vehicle. The FLS is ideally aligned to look straight forward on a line 16 which is parallel with the path 17 of travel or trajectory of the host vehicle.

In this example, the target vehicle 11 is directly ahead of the host vehicle 10 and is moving in the same direction, and, during an alignment procedure, neither vehicle changes lanes or moves on a curved section of the road 12. When the FLS takes readings, it senses the range R (the distance between the two vehicles 10 and 11) along the line 16. It also measures the azimuth angle of the target vehicle from the viewing axis of the FLS. In this example, since the FLS is ideally aligned with the path 16 and the target vehicle 11 is directly ahead of the vehicle 10, the azimuth angle θ is zero. These readings are fed to a system such as a collision warning system 14, where they are processed in a manner known in the prior art.

Still with reference to FIG. 1, again assume the circumstances set out above except that the FLS is misaligned with the path 16 as shown by the dashed line 13', and looks along the dashed line viewing axis 18. In this example, when the FLS 13' takes a reading, it indicates the range R on the line 16 and an azimuth angle $θ_a$. If the FLS 13' takes a number of time-spaced readings, in relatively close succession, all of the readings will indicate the same azimuth angle θ which is also the angle of misalignment of the FLS 13'.

In accordance with the present invention, an automatic sensor azimuth alignment system (described hereinafter) is provided, which responds to the sensor data and to data representing the line or path 16, calculates the misalignment angle $θ_a$, and, in subsequent FLS readings, employs the calculated misalignment angle $\theta_a$ to correct the measured azimuth angle data for the amount of the misalignment. Thereby, the system operates to detect any misalignment and to automatically compensate for such misalignment initially and at routine intervals as needed in the operation of the host vehicle.

Figure 2:
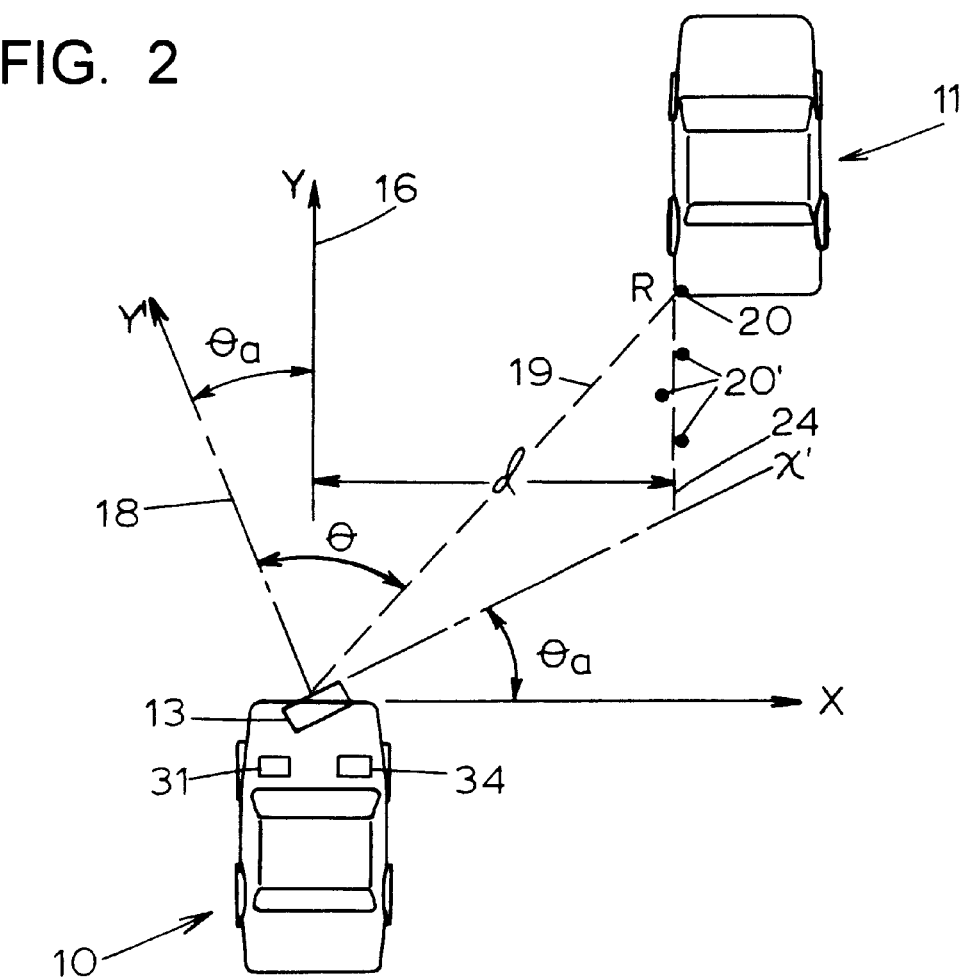
FIGS. 2 and 3 are diagrams illustrating the invention.
Figure 3:
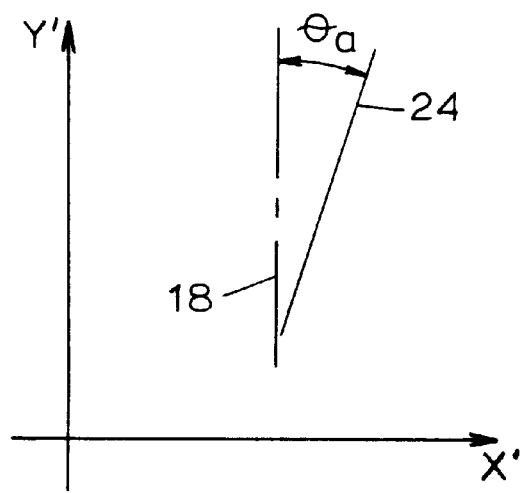

FIGS. 2 and 3 show a preferred embodiment of the invention and illustrate the system in a situation wherein two vehicles 10 and 11 are spaced with a given lateral offset d. Adjacent the front end of the host vehicle 10 is mounted an FLS 13. The target vehicle 11 is laterally offset, and the FLS 13 tracks the target 11 at a range R (line 19) and at an azimuth angle $\theta$.

Figure 4:
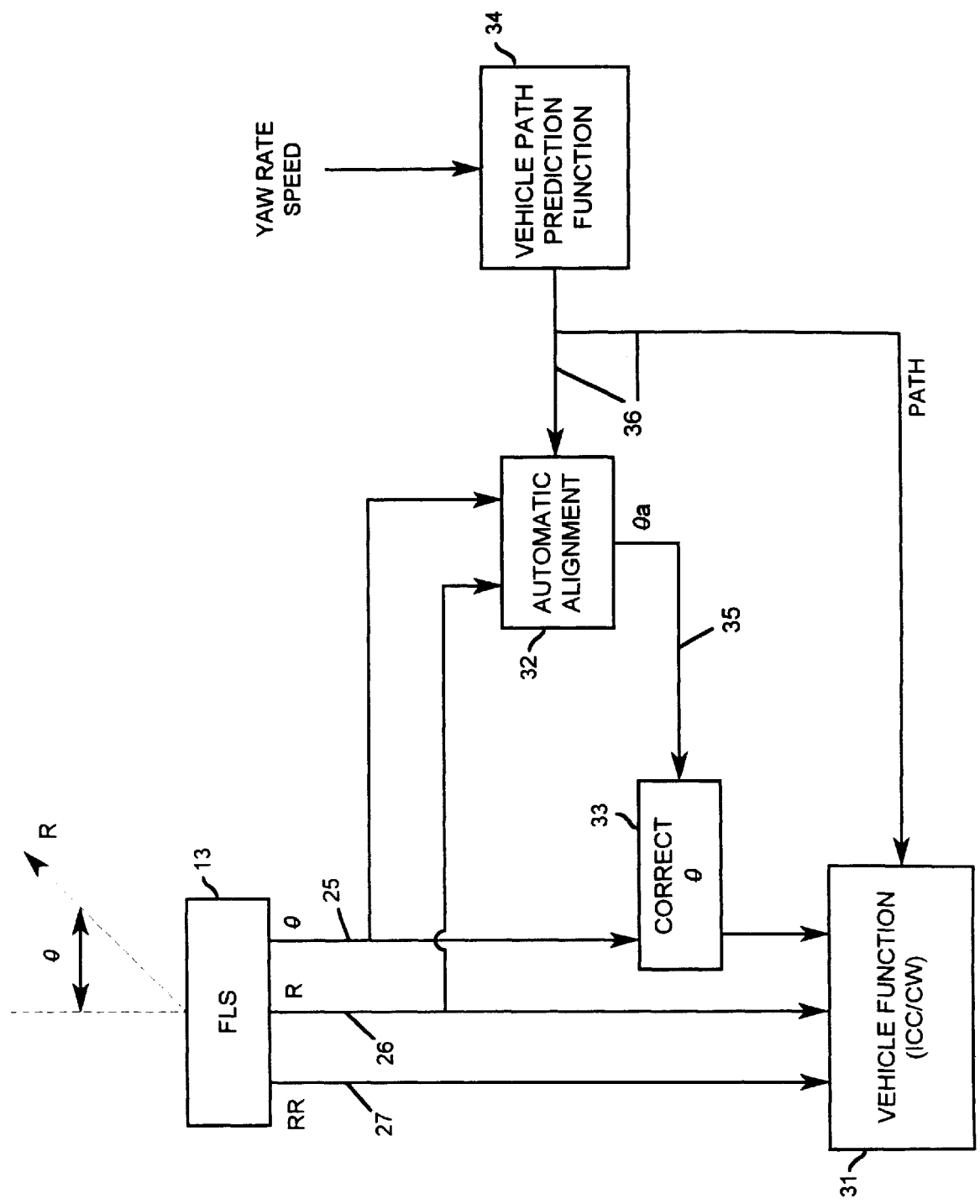
FIG. 4 is a diagram further illustrating the present invention.

The FLS may be a well known type which provides data representing the azimuth angle $\theta$, the range R and, optionally, the range rate RR. The host vehicle also includes a conventional path prediction unit 34 which provides data representing the path 16 and the speed of the vehicle 10. In this specific example, these data are passed to an ICC/CW system 31 on lines 25, 26 and 27 (FIG. 4). The angle $\theta$ and the range R are also fed to an automatic azimuth alignment system 32 (see FIGS. 4 and 5) of the host vehicle. As will be described, the alignment system 32 processes the data to determine the azimuth misalignment angle $\theta_a$, and this angle is fed on a line 35 to a circuit 33 which, in effect, subtracts the misalignment angle $\theta_a$ from the target azimuth angle $\theta$ as measured by the FLS 13. The system 31 receives the range R, the range rate RR and the corrected azimuth angle $\theta$ data.

The vehicle path prediction function 34 receives host vehicle data representing the yaw rate and the speed. The vehicle path prediction data are fed to the components 31 and 32 by the lines 36. Instead of or in addition to yaw rate, the function 34 could receive steering wheel angle, differential wheel speed, or compass and GPS data.

Figure 5:
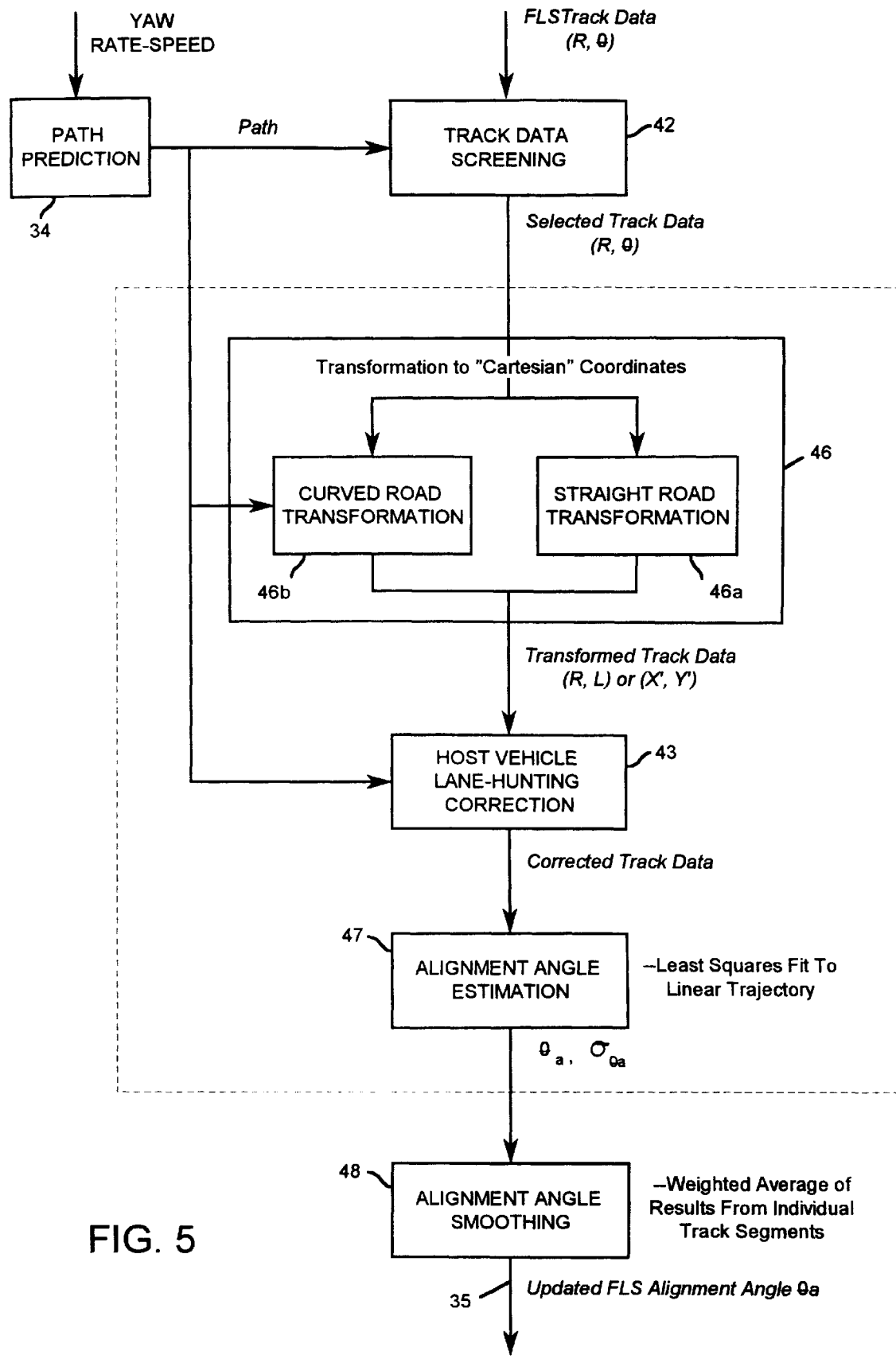
FIG. 5 is a flow chart which further illustrates the invention.

With reference again to FIGS. 2 and 3, and as an overview of the flow diagram shown in FIG. 5, assume that the FLS 13 is misaligned by the angle $\theta_a$ as represented, that the vehicles 10 and 11 are moving on a straight section of road, and that there are no lane changes. The FLS 13 provides data representing the azimuth angle $\theta$ between the axis 18 of the FLS and the line 19, the range R on the line 19, and, optionally, the range rate RR (the rate of change of the range). The unit 34 provides data representing the path 16 of travel of the host vehicle 10 and the speed of the vehicle 10. For each reading or data point of the FLS (which makes a series of time spaced readings), the angle $\theta$ and the range R data represent the location point 20 of the target vehicle 11. This location point 20 is converted to Cartesian coordinates of the axes x' and y'. At subsequent readings, assuming that the range R changes (in this example the range shortens), additional location points 20' are identified. A line 24 through the points 20 and 20' is the estimated trajectory of the target vehicle 11. The alignment angle $\theta_a$ (the angle of misalignment between the lines 16 and 18) is estimated from the angle between the trajectory 24 and the FLS axis line 18. In subsequent FLS readings, the angle $\theta_a$ is automatically subtracted from the angle $\theta$ to compensate for the amount of the misalignment and produce an accurate azimuth angle between the lines 16 and 19.

FIG. 5 is a flow diagram of an automatic alignment system in accordance with this invention, which shows the construction and operation of the invention. With reference to FIG. 5, the path prediction unit 34 receives the host vehicle yaw rate and speed data, and the path prediction data are passed to a track data screening block 42 and to a lane-hunting correction block 43. The track data (R and $\theta$) from the FLS entering the screening block 42 are screened to select track segments (based on the prediction block 34 data) for further processing. The track screening is used to select FLS track data which satisfies a basic set of criteria including, for example, sufficient change in range R between the FLS host vehicle and the target object when they are laterally offset, no curve entry or curve exit segments, and no lane changes. Data input from the host vehicle prediction unit 34 is used to determine and avoid track segments influenced by curve entry or curve exit.

The first step in the screening process for a particular track is to determine the ground speed of the track object based on the FLS track data and the host vehicle path and speed. Next, the host vehicle path data is processed to select portions of the track for which the path of the host vehicle is constant (i.e., constant radius of curvature) based on data from the vehicle path prediction function. This step will eliminate track portions for which the host vehicle entered or exited a curve or changed lanes. If the target is stationary (based on the estimated ground speed), the screening process can then proceed to the final step.

For a non-stationary target, the track data is further processed to eliminate portions for which the target changed path (i.e., entered or exited a curve or changed lanes) based on the FLS track data and vehicle path data. For example, curve entry or curve exit times for the track can be found based on curve entry or curve exit times for the host vehicle determined in the 2nd step discussed above and the target track data (i.e., the target passed over the same roadway as the host vehicle but earlier in time). The remaining track segments should then correspond to portions for which both the host vehicle and target are on the same radius of curvature. Next, lane changes can be identified by comparing the target trajectory to that expected for a target which does not change lanes. For example, the range and azimuth angle data of the FLS track can be processed to find changes in angle rate which indicate a lane change. Note, experience has shown that screening of moving targets for lane changes is difficult and use of roadside stationary targets is preferred.

The final step in the screening process is to test the remaining track segments for a sufficient change in range relative to the host vehicle by comparing the range of the first and last data points of the track segment. Track segments without sufficient change in range are eliminated. The automatic track screening function described above is the preferred mode of operation. However, while not the referred mode, the operator of the host vehicle may perform these functions by activating the alignment procedure only when the above conditions exist.

The system illustrated in FIG. 5 processes the FLS track data to estimate long term azimuth bias (misalignment) in the track data. The system processes the target range and azimuth angle data to solve for the lateral offset d (see FIG. 2) of the target (relative to the FLS direction of travel) and azimuth alignment of the FLS. In this manner, targets in any lane can be used without assuming that the target and/or the host vehicle are centered in their respective lanes. As mentioned previously, roadside stationary targets (stopped vehicles, signs, poles, trees, etc.) may also be used.

After the track data are screened to select track segments for further processing, selected track segments are then transformed to Cartesian coordinates in the block 46. If the unit 34 predicts a straight path, a block 46a is used to transform the data to Cartesian coordinates, whereas if a curved path is predicted, a block 46b makes the transformation. The transformed data are then corrected in block 43 to compensate for any FLS vehicle lane hunting based on the predicted FLS vehicle path. The alignment angle $\theta_a$ of the FLS is estimated in block 47 from the transformed/corrected track segment data and then smoothed in block 48 by a smoothing technique such as a weighted average of the estimates from multiple track segments. After sufficient smoothing, an updated alignment angle $\theta_a$ is available on line 35 to realign the subsequent FLS track data.

With reference again to FIG. 4, in subsequent FLS data, after an alignment estimation procedure as described above, the block 33 receives the FLS measured azimuth angle $\theta$ and the alignment angle $\theta_a$, subtracts the angle $\theta_a$ from the angle $\theta$, and feeds the corrected azimuth angle data to the function block 31.

The above alignment process assumes a constant lateral offset d (i.e., neither the host vehicle nor the target vehicle changes lanes) which results in a linear track trajectory 24 in FLS Cartesian coordinates, as shown in FIGS. 2 and 3. The slope of the target trajectory 24 determines the FLS alignment angle and is solved for in a least squares manner (block 47) to smooth out errors due to, for example, FLS azimuth measurement errors and lane hunting by the target (such as oscillations in lateral position within the lane). Track data from straight road sections is preferable although curved road track data can also be used with an appropriate transformation in the block 46b of the data based on the estimated radius of curvature (from the vehicle path prediction function in block 34). Furthermore, vehicle path prediction data is used to correct in block 43 for lane hunting by the host vehicle. Note that this alignment process requires a change in range between the host vehicle and the target to estimate the FLS alignment. The alignment angle $\theta_a$ is estimated in block 47 by a least-squares fit to the linear target trajectory. Supporting processing in block 48 is also performed to smooth the FLS alignment estimate by a weighted average of the estimates from individual track segments.

In this specific example, the underlying vehicle motion model assumes that (where the target is also a moving vehicle) the host and target vehicles are constrained to lanes and travel with a constant lateral position within their respective lanes. For a straight road section, the target vehicle trajectory in FLS Cartesian coordinates is then a straight line regardless of any linear acceleration by either vehicle. For a fixed lateral offset from the FLS, and with reference to FIGS. 2 and 3, this linear trajectory is given as follows:

$$x = d \tag{1}$$
$$x' = (\tan \theta_a) y' + d(\cos \theta_a + \sin \theta_a \tan \theta_a) \tag{2}$$

where:
- x=target lateral position in lane coordinates
- y=target down range position in lane coordinates
- x'=target lateral position in FLS coordinates=R sin $\theta$
- y'=target down range position in FLS coordinates=R cos $\theta$
- $\theta_a$=alignment angle of the FLS relative to the host vehicle direction of travel
- d=lateral offset between the FLS vehicle and the target vehicle
- R=target range measured by the FLS
- $\theta$=target azimuth angle measured by the FLS Note that, since the underlying assumption is a fixed lateral offset, the above model applies to stationary roadside targets as well as to vehicles constrained to lanes.

To determine the alignment angle from a segment of track data, the FLS range and angle data are transformed to cartesian coordinates and a standard least-squares approach is used to determine the parameters of the line which best fits the data. Either a batch or recursive least squares approach can be used. The resulting slope of the best fit line is used to determine the alignment angle (from the equation above, slope=tan $\theta_a$). Note that either unsmoothed FLS measurements or smoothed track data can be used.

If misalignment of the FLS is small (for example, if $\theta_a$ is less than 5 degrees), the target trajectory in FLS coordinates can be simplified as shown in the equation:

$$x' \approx (\theta_a) y' + d \tag{3}$$

In this case, the alignment angle is estimated directly as the slope of the best fit line.

If the azimuth angle of the target is sufficiently small, the transformation of the FLS target data to Cartesian coordinates may be simplified as shown below:

$$x' = R\theta \tag{4}$$
$$y' = \theta \tag{5}$$

A system in accordance with the invention may also be used when the target vehicle moves along a curve in a road (see FIG. 6), but this of course requires a transformation of the FLS data to compensate for the curvature of the road. In this situation, again assuming that the host and target vehicles maintain a constant lateral position within their lanes, the target trajectory is linear with respect to the arc length distance from the FLS along the curve and the lateral distance from the curved FLS vehicle path. Assuming the FLS vehicle and the target vehicle are on the same curved road section with constant radius of curvature, and referring to FIG. 6, the appropriate transformation is as follows:

$$L = RC_{FLS} - RC_T \tag{6}$$
$$= RC_{FLS} - [R^2 + RC_{FLS}^2 - 2(R)(RC_{FLS}) \cos (90-\theta)]^{1/2} \tag{7}$$
$$R_{arc} \approx R \tag{8}$$

where
- L=lateral distance from the curved FLS vehicle path
- $R_{arc}$=arc length distance along the FLS curved path
- $RC_{FLS}$=radius of curvature of the FLS vehicle path
- $RC_T$=radius of curvature of the target vehicle This transformation applies to stationary roadside objects as well as vehicles constrained to road lanes.

Transforming the FLS range and azimuth data to $R_{arc}$, L coordinates results in a linear trajectory with a slope which determines the alignment angle as described above. In other words, $$L = (\tan \theta_a) R_{arc} + d(\cos \theta_a + \sin \theta_a \tan \theta_a) \tag{9}$$

or $$L \approx (\theta_a) R_{arc} + d \tag{10}$$

As before, the method of least squares is used to estimate the parameters of the best fit line and hence the alignment angle.

Figure 6:
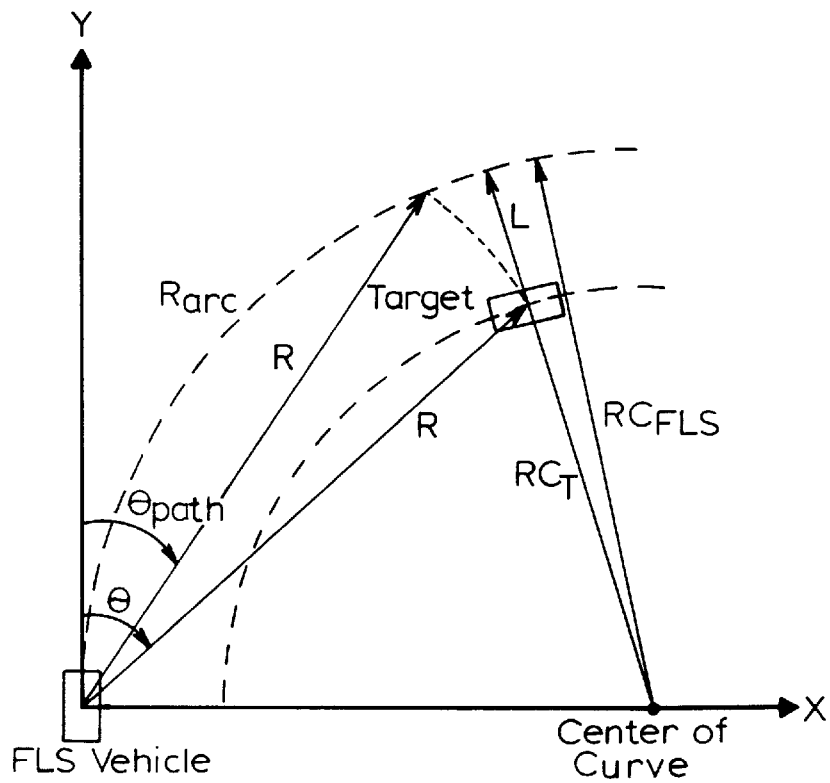
FIGS. 6, 7 and 8 are curves illustrating the operation of the invention.

In typical ICC situations, the minimum radius of curvature is limited (greater than 500 m) and the target azimuth angles are small (less than 10 degrees) which, referring to FIG. 6, leads to the further simplification given below:

$$L \approx R(\theta - \theta_{path}) \approx R [\theta - R/2RC_{FLS}] \tag{11}$$

where $\theta_{path}$=azimuth angle to FLS vehicle path at range $R=\sin^{-1}[R/2RC_{FLS}] \approx R/2RC_{FLS}$ (12)

The foregoing analysis assumes that the target exhibits a change in range relative to the host vehicle to form a trajectory as indicated in FIG. 3. An alternate alignment technique which does not require a change in range is useful when the host and the target are in the same lane as shown in FIG. 1, as determined based on the path prediction function of the unit 34. The model assumes that both the host and the target vehicles are in the same lateral position in the same lane (for example, are both centered in the same lane). In this case, for a properly aligned unit, the azimuth angle of the target equals the predicted path angle of the host vehicle. The difference between these two angles is then equal to the azimuth misalignment of the FLS and is solved for in a least squares manner to smooth out errors due to, for example, FLS azimuth measurement errors and lane hunting by either the host vehicle or the target vehicle (such as oscillations in lateral position within the lane).

Track data is screened to select targets in the same lane as the host vehicle based on the predicted vehicle path (block 34). However, if the FLS is misaligned, target selection may be in error especially at long range. Therefore, track data is preferably limited to short to moderate range segments for which a target selection is less sensitive to FLS misalignment. In addition, there should be no curve entry or curve exit and no lane changes. As discussed for the embodiment wherein the target is laterally offset, azimuth alignment estimates from multiple track segments are combined in a weighted average and the FLS alignment estimate is updated when a sufficient number of track segments have been processed.

An advantage of the arrangement wherein the host and target are in the same lane is that a change in range between the host vehicle and the target vehicle is not required. A disadvantage is that a lateral offset between the FLS vehicle and the target vehicle in the same lane leads to an azimuth bias which would be mistaken as an FLS misalignment. Averaging over multiple target tracks should mitigate this error except for the instance caused by an FLS vehicle that is driven with a consistent offset from the lane center. Another disadvantage is that only in-path target tracks may be used (at close to moderate range to avoid target selection errors).

Assuming that the lateral offset d equals zero, the alignment angle is determined by the difference in the angle between the target position and the FLS vehicle path at the target range R. In other words, $\theta_a = \theta - \theta_{path}$ (13)

To determine the alignment from a segment of track data, either a batch or recursive least-squares approach is used to estimate the average difference between the FLS target azimuth data and the path angle.

Figure 7:
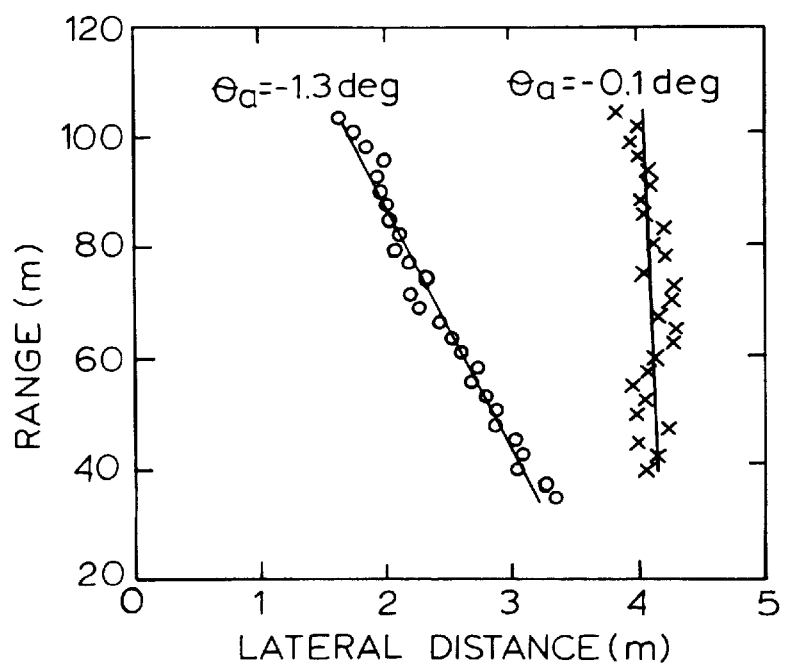

FIG. 7 shows an example set of recorded sensor data using an alignment system in accordance with this invention, employed in two situations wherein the target is laterally offset from the host vehicle. A radar sensor mounted on a passenger car was used to collect range and azimuth angle data on a roadside sign post. The vehicle was operated on a straight road section at about 55 mph and the sensor radar collected data at a 10 Hz rate (100 msec between updates). The sign post was in track for roughly 3 seconds (about 30 data points) over approximately 70 m of range.

Two cases were evaluated, a reference case with the sensor mechanically aligned to near zero degrees and one with the sensor intentionally misaligned relative to the first reference by about 1 degree. FIG. 7 shows the transformed radar data and the least-squares-best-fit line for one pass for each case. As shown in FIG. 7, the system estimated 1.2 degrees of alignment difference between the two cases.

Figure 8:
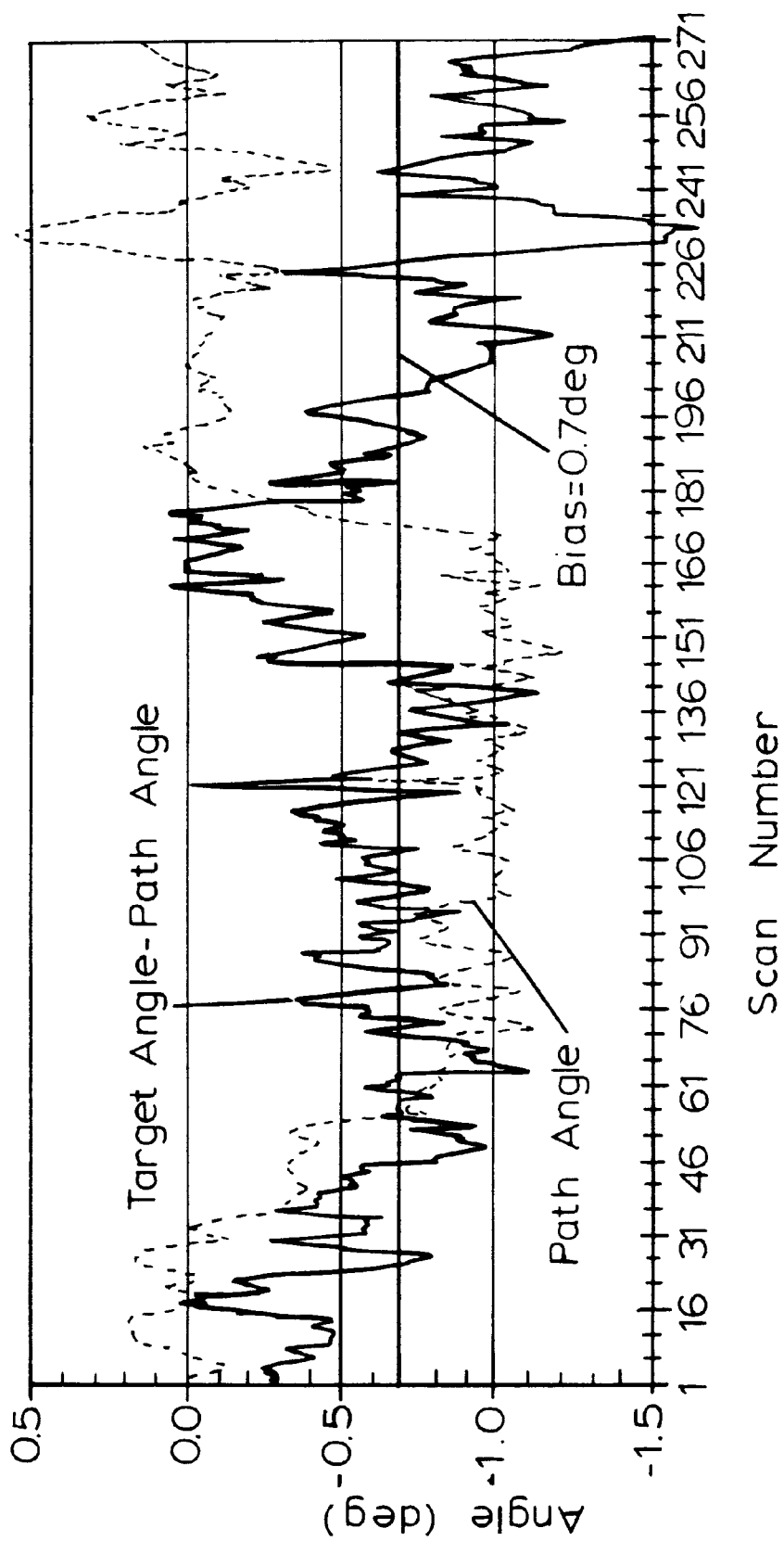

FIG. 8 shows data and results of the alternate technique for tests wherein the host vehicle and the target were in the same lane with a nearly constant range. Again, a radar sensor was mounted on a passenger vehicle. The host vehicle was following a moving target vehicle in the same lane at about 60 MPH at a near constant range of approximately 40 meters. Sensor and Vehicle data was collected at a 10 Hz rate for about 30 seconds. The data plotted shows the host vehicle path angle and the difference between the target angle indicated by the sensor and the path angle. Also shown is the average difference between the target and the path angle which indicates a sensor misalignment of about 0.7 degrees. Note that the sensor vehicle path was initially straight, followed by a curve with near constant radius of curvature of about 1000 meters and then back to a straight road. During the curve entry and the curve exit portions, the bias between the target angle and path angle does not directly correspond to misalignment.

The constructions of the FLS and the path prediction unit are well known in the prior art and may be the same as those found in ICC and/or CW units. All of the logic components shown in FIGS. 4 and 5 are either known in the prior art or have a design which is obvious to those skilled in this art. Components such as the blocks 43 and 48 are not essential but they improve the performance of the alignment process.

While apparatus in accordance with this invention is illustrated and described in use in a vehicle operated on a highway and in conjunction with a CW and/or an ICC, its use is not so limited. It may for example also be useful in water vehicles and aircraft, and the correction of the misalignment may be useful with systems other than a CW or an ICC.

While specific examples of apparatus embodying the invention have been illustrated and described, further modifications and uses falling within the scope of the invention may be provided by persons skilled in the art.

What is claimed is:

1. A method of automatically determining the angle of alignment of a forward looking sensor mounted on a host vehicle relative to the path of travel of the host vehicle while the host vehicle is traveling on a road adjacent a target, the sensor making periodic sensor readings and each reading including a set of range and azimuth angle measurements of the target, the host vehicle further including a path prediction unit which provides host path data representative of the direction of travel of the host vehicle, said method comprising the steps of:

a) receiving a plurality of said sensor readings at time intervals over a segment of the road;

b) for each of said readings, determining the location point of the target based on the range and azimuth angle data;

c) from the location point determinations for a plurality of said sensor readings, determining the trajectory line of said target; and d) From said trajectory line and from said direction of travel of said host vehicle, determining any misalignment angle of said sensor relative to said direction of travel.

2. A method as set forth in claim 1, wherein said target is laterally offset from the direction of travel of the host vehicle and exhibits a change in range relative to the host vehicle.

3. A method as set forth in claim 1, wherein said target is a vehicle in the same lane of travel on said road as said host vehicle, and said target vehicle does not necessarily change range relative to said host vehicle.

4. A method as set forth in claim 1, wherein said determination in step (b) is made by transforming said range and azimuth angle measurements to Cartesian coordinates.

5. A method as set forth in claim 1, and further including the steps of making at least one subsequent sensor reading of range and azimuth angle of a target, and combining said misalignment angle with said subsequent sensor reading to obtain an accurate azimuth angle of the target.

6. A method as set forth in claim 1, wherein step (c) is performed by a least squares fit procedure.

7. A method of automatically correcting for any misalignment of a forward-looking sensor mounted on a host vehicle while the host vehicle is moving on a vehicle path adjacent a target, the sensor making periodic readings and each reading including a set of range and azimuth angle measurements of the target, the vehicle further including a path prediction unit which provides path data representative of the direction of travel and the speed of the host vehicle, said method comprising the steps of:
   a) processing a set of said range and azimuth angle measurements and estimating the target location point;
   b) repeating step (a) for a plurality of readings over a segment of said vehicle path;
   c) processing said plurality of readings from step (b) to produce a line representing the trajectory of the target;
   d) estimating the alignment angle of said sensor relative to the direction of travel of said host vehicle based on said line and said path data; and
   e) in subsequent readings of said sensor, combining said estimated alignment angle with the azimuth angle to compensate for any misalignment of said sensor.

8. A method as set forth in claim 7, wherein said processing of step (a) includes transforming said target location to cartesian coordinates.

9. A method as set forth in claim 7, wherein said vehicle path includes a curved segment, and said processing of step (a) includes a curved road transformation.

10. A method as set forth in claim 7, and further including the step after step (d) of combining estimates from a plurality of said segments of said vehicle path to obtain an average of said estimates which is utilized in step (d) as said estimated alignment angle.

11. A method as set forth in claim 7, wherein the host vehicle further includes a warning system, and further including the step of utilizing the misalignment compensated azimuth angle in said warning system.

12. Apparatus for determining the angle of any misalignment of a forward-looking sensor mounted on a host vehicle relative to the path of travel of the host vehicle, the sensor producing a set of range and azimuth angle data of a target at each of a series of readings, the host vehicle further including a path prediction unit for producing path data, said apparatus comprising:
   a) first processing means responsive to a plurality of said sensor readings for producing a plurality of location points of said target;
   b) second processing means responsive to said plurality of location points for estimating a trajectory line of the target; and
   c) third processing means responsive to said path data and to said trajectory line for estimating said angle of any misalignment.

13. Apparatus as set forth in claim 12, wherein said path prediction unit provides curve data representing the estimated radius of curvature of the path, and said first processing means receives said curve data and transforms said estimate based on said estimated radius of curvature.

14. An automatic azimuth angle correction system for a host vehicle, comprising:
   a) a forward-looking sensor for mounting on the host vehicle, said sensor being operable to make periodic readings of a target and each reading including a set of range and azimuth angle measurements of the target;
   b) a path prediction unit for producing path prediction data of the host vehicle;
   c) first processing means responsive to a plurality of said sensor readings for producing a plurality of location points of said target;
   d) second processing means responsive to said plurality of location points for estimating a trajectory line of the target; and
   e) third processing means responsive to said path data and to said trajectory line for estimating any angle of misalignment.

15. An automatic azimuth angle correction system as set forth in claim 14, and further including a CW/ICC in said host vehicle, said CW/ICC being connected to receive azimuth angle data from said sensor, and means for combining said azimuth angle data and said angle of misalignment and for producing an accurate azimuth angle for processing in said CW/ICC.

\* \* \* \* \*